US007922570B2

(12) United States Patent  
Del Prado (10) Patent No.: US 7,922,570 B2  
(45) Date of Patent: Apr. 12, 2011

(54) FANTASY SPORTS AUCTION SYSTEM

(76) Inventor: George Del Prado, North Las Vegas, NV (US)

( * ) Notice: Subject to any disclaimer, the term of this patent is extended or adjusted under 35 U.S.C. 154(b) by 1237 days.

(21) Appl. No.: 11/526,151

(22) Filed: Sep. 22, 2006

(65) Prior Publication Data

US 2007/0054718 A1  Mar. 8, 2007

Related U.S. Application Data

(63) Continuation-in-part of application No. 10/314,532, filed on Dec. 9, 2002, now abandoned.

(51) Int. Cl.  
*A63F 13/00* (2006.01)

(52) U.S. Cl. .......... 463/4; 463/1; 463/9; 463/40; 463/42

(58) Field of Classification Search .................. 463/4, 1, 463/9, 40, 42  
See application file for complete search history.

(56) References Cited

OTHER PUBLICATIONS

NFL Draft 1998 basics, (CNNSI) Apr. 14, 1998, online, retrived from CNNSI http://sportsillustrated.cnn.com/football/nfl/events/1998/nfldraft/news/1998/04/14draft_basics/.*

Who Do I Start: Fantasy Football League Charter, (O'shea, Daniel S.) Oct. 1, 2000, retived from Who Do I Start website http://www.whodoistart.com/wdis/charter.htm.*  
Fantasy Rules (Ball Buster Fantasy Football League) Sep. 1, 1998, retived from Ball Buster Fantasy Football League webiste http://www.fortunecity.com/olympia/wagner/362/rules.htm.*  
Final Roster (Ball Buster Fantasy Football League) Sep. 1, 1998, retived from Ball Buster Fantasy Football League webiste http://www.fortunecity.com/olympia/wagner/362/rosters.htm.*  
Leader Board (Ball Buster Fantasy Football League) Sep. 1, 1998, retived from Ball Buster Fantasy Football League webiste http://www.fortunecity.com/olympia/wagner/362/leaderboard.htm.*

* cited by examiner

*Primary Examiner* — Dmitry Suhol  
*Assistant Examiner* — Sunit Pandya  
(74) *Attorney, Agent, or Firm* — Clement Cheng (57) ABSTRACT

A fantasy sports game for a plurality of participants representing sports teams each wishing to form a fantasy sports team made up of actual athletes, and each operating a participant terminal operable to act as a client on a network, the system comprising: a host controller, the host controller comprising a computer operable to act as a server on the network and to communicate with the participant terminals over the network; and data storage accessible to the host controller. A variance report calculates the total difference in price between all the sold players' prices and the values inputted by the participant team before the auction, and the variance report can also show the difference in price between all the sold players' prices and the values inputted by the participant team before the auction organized by position.

1 Claim, 4 Drawing Sheets

Pi Kapp A League

210 — League name will be displayed here.
220 — Names of all teams will be displayed.
230 — All teams' displays are based on league's lineup requirements.
240 — Player data columns is based on sport and user inputs (different data can be shown here)
250 — Display how much all teams have spent and how much is left in their salary caps.
260 — Names of each player may be hyperlinked to show fantasy research data.
270 — How much money is spent on each player is shown in the salary column.

Fighting Firedogs

| Pos | Name | Team | Bye | Salary |
|---|---|---|---|---|
| QB | Daunte Culpepper | MIN | 5 | $22 |
| RB | Thomas Jones | ARI | 6 | $8 |
| RB | | | | |
| WR | | | | |
| WR | | | | |
| WR | | | | |
| TE | | | | |
| K | | | | |
| DL | | | | |
| DB | | | | |
| B | | | | |
| B | | | | |
| B | | | | |
| B | | | | |

Salary Cap: $70  Total: $30

Chicago Black Sox

| Pos | Name | Team | Bye | Salary |
|---|---|---|---|---|
| QB | Jeff Garcia | SF | 4 | $28 |
| RB | Shaun Alexander | SEA | 5 | $36 |
| RB | | | | |
| WR | Derrick Mason | TEN | 7 | $16 |
| WR | | | | |
| WR | | | | |
| TE | | | | |
| K | | | | |
| DL | | | | |
| DB | | | | |
| B | | | | |
| B | | | | |
| B | | | | |
| B | | | | |

Salary Cap: $20  Total: $80

Palisades

| Pos | Name | Team | Bye | Salary |
|---|---|---|---|---|
| QB | Travi... | | | |
| RB | Ricky... | | | |
| RB | | | | |
| WR | Terr... | | | |
| WR | John... | | | |
| WR | | | | |
| TE | | | | |
| K | Jaso... | | | |
| DL | | | | |
| DB | Keva... | | | |
| B | | | | |
| B | | | | |
| B | | | | |
| B | | | | |

Salary Cap: $...

Men Toss

| Pos | Name | Team | Bye | Salary |
|---|---|---|---|---|
| QB | Kurt Warner | STL | 8 | $34 |
| RB | Fred Taylor | JAC | 5 | $19 |
| RB | | | | |
| WR | | | | |
| WR | | | | |
| WR | | | | |
| TE | Jeremy Shockey | NYG | 7 | $0 |
| K | | | | |
| DL | Derrick Brooks | TAM | 10 | $2 |
| DB | | | | |
| B | Trent Green | KC | 9 | $5 |
| B | | | | |
| B | | | | |
| B | | | | |

Salary Cap: $40  Total: $60

Raider Nation

| Pos | Name | Team | Bye | Salary |
|---|---|---|---|---|
| QB | | | | |
| RB | | | | |
| RB | | | | |
| WR | Kevin Johnson | CLE | 5 | $10 |
| WR | | | | |
| WR | | | | |
| TE | | | | |
| K | | | | |
| DL | Bill Romanowski | OAK | 3 | $0 |
| DB | | | | |
| B | | | | |
| B | | | | |
| B | | | | |
| B | | | | |

Salary Cap: $90  Total: $10

Crazy Talk

| Pos | Name | Team | Bye | Salary |
|---|---|---|---|---|
| QB | Aaron Brooks | NO | 9 | $14 |
| RB | | | | |
| RB | | | | |
| WR | David Boston | ARI | 6 | $22 |
| WR | | | | |
| WR | | | | |
| TE | | | | |
| K | Jeff Wilkins | STL | 8 | $2 |
| DL | | | | |
| DB | Kwamie Lassiter | ARI | 6 | $3 |
| B | | | | |
| B | | | | |
| B | | | | |
| B | | | | |

Salary Cap: $59  Total: $41

N.O. Mardi Gras

| Pos | Name | Team | Bye | Salary |
|---|---|---|---|---|
| QB | Duce Staley | PHI | 6 | $3 |
| RB | | | | |
| RB | | | | |
| WR | Randy Moss | MIN | 5 | $34 |
| WR | Terrell Owens | SF | 4 | $32 |
| WR | Marty Booker | CHI | 6 | $9 |
| TE | Chad Lewis | PHI | 6 | $1 |
| K | | | | |
| DL | | | | |
| DB | | | | |
| B | | | | |
| B | | | | |
| B | | | | |
| B | | | | |

Salary Cap: $21  Total: $79

King City

| Pos | Name | Team | Bye | Salary |
|---|---|---|---|---|
| QB | Mars... | | | |
| RB | Marv... | | | |
| RB | Davi... | | | |
| WR | | | | |
| WR | | | | |
| WR | | | | |
| TE | Eric... | | | |
| K | Joe N... | | | |
| DL | | | | |
| DB | | | | |
| B | | | | |
| B | | | | |
| B | | | | |
| B | | | | |

Salary Cap: $7...

Cal Golden Bears

| Pos | Name | Team | Bye | Salary |
|---|---|---|---|---|
| QB | | | | |
| RB | Garrison Hearst | SF | 4 | $15 |
| RB | | | | |
| WR | | | | |
| WR | | | | |
| WR | | | | |
| TE | Tony Gonzalez | KC | 9 | $14 |
| K | Doug Brien | MIN | 5 | $0 |
| DL | | | | |
| DB | | | | |
| B | | | | |
| B | | | | |
| B | | | | |
| B | | | | |

Salary Cap: $29

Bay Area Bombers

| Pos | Name | Team | Bye | Salary |
|---|---|---|---|---|
| QB | Peyton Manning | IND | 4 | $27 |
| RB | Tyrone Wheatley | OAK | 3 | $2 |
| RB | Michael Pittman | TAM | 10 | $8 |
| WR | Jerry Rice | OAK | 3 | $9 |
| WR | | | | |
| WR | | | | |
| TE | | | | |
| K | | | | |
| DL | | | | |
| DB | | | | |
| B | Michael Bennett | MIN | 5 | $8 |
| B | Priest Holmes | KC | 9 | $24 |
| B | | | | |
| B | | | | |

Salary Cap: $22  Total: $78

Break in figure is to show diagram more clearly. All teams in the league are to be displayed in this view.

Figure 3: Variance Report Screen

| Variance Report | |
|---|---|
| Total Variance: | $3 |
| QB Variance: | $3 |
| RB Variance: | -$7 |
| WR Variance: | $1 |
| TE Variance: | $0 |
| K Variance: | $0 |
| DEF Variance: | $0 |

310 — List of all positions set as starters in fantasy league

320 — Total Variance is the sum of all position-specific variances.

330 — Difference in dollar value between user-inputted prices (indicating user's personal valuation of players) and actual auction prices.

Figure 4: Team Details Window

410 Dollar amount left in salary cap

420 Positional Data: First column shows how many players in each position have been bought. Second column shows dollar amount spent in each position. Number in parenthesis in column header is number of required starters 430 Total number of players bought. This is the sum of the first column under each position header.

440 Total dollar amount spent on all players bought. This is the sum of the second column under each position header

| Nom. Order | Team Name | Status | Max Bid | Sal Cap | Total (9) | | QB (1) | | RB (2) | | WR (3) | | TE (1) | | K (1) | | DEF (1) | |
|---|---|---|---|---|---|---|---|---|---|---|---|---|---|---|---|---|---|---|
| 1 | NY Giants | Online | $171 | $185 | 1 | $15 | 0 | $0 | 1 | $15 | 0 | $0 | 0 | $0 | 0 | $0 | 0 | $0 |
| 2 | SF 49ers | Online | $184 | $197 | 2 | $3 | 0 | $0 | 0 | $0 | 0 | $0 | 0 | $0 | 1 | $1 | 1 | $2 |
| 3 | Indy Colts | Online | $75 | $84 | 6 | $116 | 2 | $24 | 2 | $74 | 1 | $14 | 0 | $0 | 0 | $0 | 1 | $4 |
| 4 | LA Raiders | Offline | $91 | $101 | 5 | $99 | 1 | $15 | 3 | $60 | 1 | $24 | 0 | $0 | 0 | $0 | 0 | $0 |
| 5 | TB Buccaneers | A.I. | $113 | $124 | 4 | $76 | 1 | $8 | 2 | $54 | 0 | $0 | 1 | $14 | 0 | $0 | 0 | $0 |
| 6 | NY Jets | Online | $103 | $111 | 7 | $89 | 1 | $3 | 1 | $34 | 3 | $48 | 1 | $3 | 0 | $0 | 1 | $1 |

FANTASY SPORTS AUCTION SYSTEM

This application is a CIP of U.S. application Ser. No. 10/314,532 titled Fantasy Sports System by same inventor George DelPrado filed Dec. 9, 2002, now abandoned.

DISCUSSION OF RELATED ART

Fantasy sports is one of the fastest growing and most popular games in the United States today. Fantasy sports allow people the opportunity to experiment and explore the management and coaching aspect of professional spectator sports. Fantasy teams are based on real-life athletes on real-life teams and have seasons similar to real-life sports.

Fantasy sports is a simulation game where sports fans act as managers of simulated sports teams called "fantasy teams". Thus, a "manager," "user," or "participant" interchangeably refers to natural person participants in the fantasy sport. An "athlete" refers to a real world natural person professional athlete or the parallel world fantasy athlete character that represents him or her. One or more users can form a fantasy sports league which consists of several teams which are managed by the individual league participants. These league participants receive the authority and responsibility for the management of a simulated sports team. Fantasy teams compete against each other in a series of games. Fantasy athletes are not natural persons like sports fans, but rather a collection of statistics and data often derived from the historical statistics of actual athletes.

The outcome of games is highly dependent on the composition of fantasy athletes in a fantasy league because different fantasy athletes have different statistics that contribute to varying degrees of success in games. The outcome of a game is a calculation based on actual athlete statistics during actual games.

A fantasy league consists of a number of users that create and manage teams based on a pool of athletes[1]. For example, in a 12-team fantasy football league, NFL football athletes are distributed among the 12 teams in the league. Each team might be required to "start" one quarterback, two running backs, three wide receivers, and a kicker (i.e. the "starters" are those athletes whose performance for a given week will contribute to the team's point total).

Additionally, the team may have six extra athletes on their "bench," extra athletes to act as back-ups for the usual starters when they are injured or during their off-weeks. The seven starters and six back-ups make up a total of 13 roster spots on the team. Each roster spot might be filled by athletes from different NFL teams.

At the outset of the season, the league members' agree upon a point system in order to measure the value of each athlete. Based on the athletes' weekly performance in professional football games, the values of the athletes are tallied to see which team member has the highest scoring team. Throughout the season, league participants' may try to improve their team by trading athletes to other participants or by adding and dropping athletes from the available pool of NFL athletes. Although football is used as an example throughout this document, the Fantasy Sports Auctioneer can be used for any fantasy sport—baseball, basketball, golf, NASCAR, hockey, etc.

Fantasy athlete statistics and related data are often stored and/or viewed on some kind of terminal (like a computer or a cell phone) connected to a network like the Internet. This network allows diverse sports fans from around the world to meet and participate in leagues. Many fantasy sports websites have already been established over the last few years to facilitate the game and/or provide the research necessary to play it. Some examples of these websites are:
   http://fantasysports.yahoo.com
   http://games.espn.go.com
   http://www.fanball.com The current systems lack certain interactive functions and can be improved. The first two websites listed above do not offer an auction-based method of distributing athletes (only "snake draft," which is discussed below). The last website on the list offers an auction-based method of distributing athletes, but uses a very different process than the Fantasy Sports Auctioneer System (e.g. among other differences, its users bid on athletes that are nominated for auction in random order determined by its host controller). Other auction systems do not occur in real time. Another example is U.S. Pat. No. 6,371,855 by Gavriloff Apr. 16, 2002. It shows a Fantasy Internet sports game where teams starting with a number of game value units associated with each athlete varies in correlation with the demand of the participants for that athlete and a participant receives periodically a value-based reward correlated to the value and/or performance of the athletes on a participant's team. One of the objects of the invention is to introduce additional functionality to the online fantasy sports system to make the experience more enjoyable.

BRIEF DESCRIPTION OF THE DRAWINGS

FIG. 2 shows a league team display.

DESCRIPTION OF THE PREFERRED EMBODIMENT

Definitions

User: a natural person participant or one or more natural persons acting as a single user, or a computerized user in the fantasy game. These persons do not play sports and are not athletes.

Fantasy athlete: a collection of statistics and data often derived from the historical statistics of real natural person athletes who play sports. These persons are professional athletes and so are usually somewhat famous. Athletes are also called players.

Fantasy team: a collection of fantasy athletes managed by a user.

Fantasy league: a collection of users and their fantasy teams along with a set of rules regulating the management, scheduling, and scoring of competitions between fantasy teams.

Fantasy sports: a game consisting of one more fantasy leagues.

The present invention relates to an electronic system of auctioning athletes by nominated auction in a fantasy sports league. Various users access a central server through a network such as the Internet protocol via remote personal computers. The system is preferably embodied as a software application operating on a central server allowing a diverse variety of fantasy sports websites to integrate with the Fantasy Sports Auctioneer System to give its users the option of using the nominated auction method.

The fantasy league begins with an athlete distribution method. A first method of prior art is called the "snake draft." In a "snake draft", fantasy team selection order is first randomly determined. In order of the randomized list, each team then takes turns selecting an athlete to be added to their fantasy team. To make it as fair as possible, the randomized team order is inverted every other round, to allow the team with the last pick of the current round the first pick of the next round. The first method is more easily implemented on the Internet as the central server determines priority for athlete selection order and then allows teams to choose athletes based upon the team priority.

A second method is by nominated auction. Team order is first randomized and then snaked or inverted every other round as in the "snake draft." Instead of choosing an athlete to be added to a user's team, the user nominates an athlete for auction and places an opening bid for the athlete. Other users (i.e. the managers of the other teams in the league) may then outbid the nominating team and bidding for the athlete begins as each team interested in acquiring the athlete may enter successively higher bids. Each team begins with the same preset imaginary budget (also referred to in this document as a "salary cap") representing fantasy money or game value units that are spent on bidding for athletes. The highest bid wins the athlete and the amount of the winning bid is subtracted from the team's budget (therefore, a user cannot enter a bid that is higher than his or her remaining budget). This process continues until each team has a full roster. If an auction participant fills his or her roster, he or she is finished with the auction, regardless of whether they have spent all the allotted salary cap money.

The second method is preferably implemented by a software application operating on a central server. This allows a diverse variety of fantasy sports websites to integrate with the auctioneer software application to give their users a variety of athlete distribution options including the nominated auction method. Currently, almost all fantasy sports websites only offer the "snake draft" method because there is no real, efficient, and electronic version of the traditional process of the "auction method," something that the present invention, the Fantasy Sports Auctioneer System, will provide.

A. Fantasy Sports Auctioneer System

The software application implementing the second method of nominated auction has various parts. The first part is the Fantasy Sports Auctioneer. The Fantasy Sports Auctioneer operates as an auction house to facilitate traditional auction rules. The Fantasy Sports Auctioneer is designed to facilitate the auction method of distributing athletes.

B. Screen Components

Figure 1:
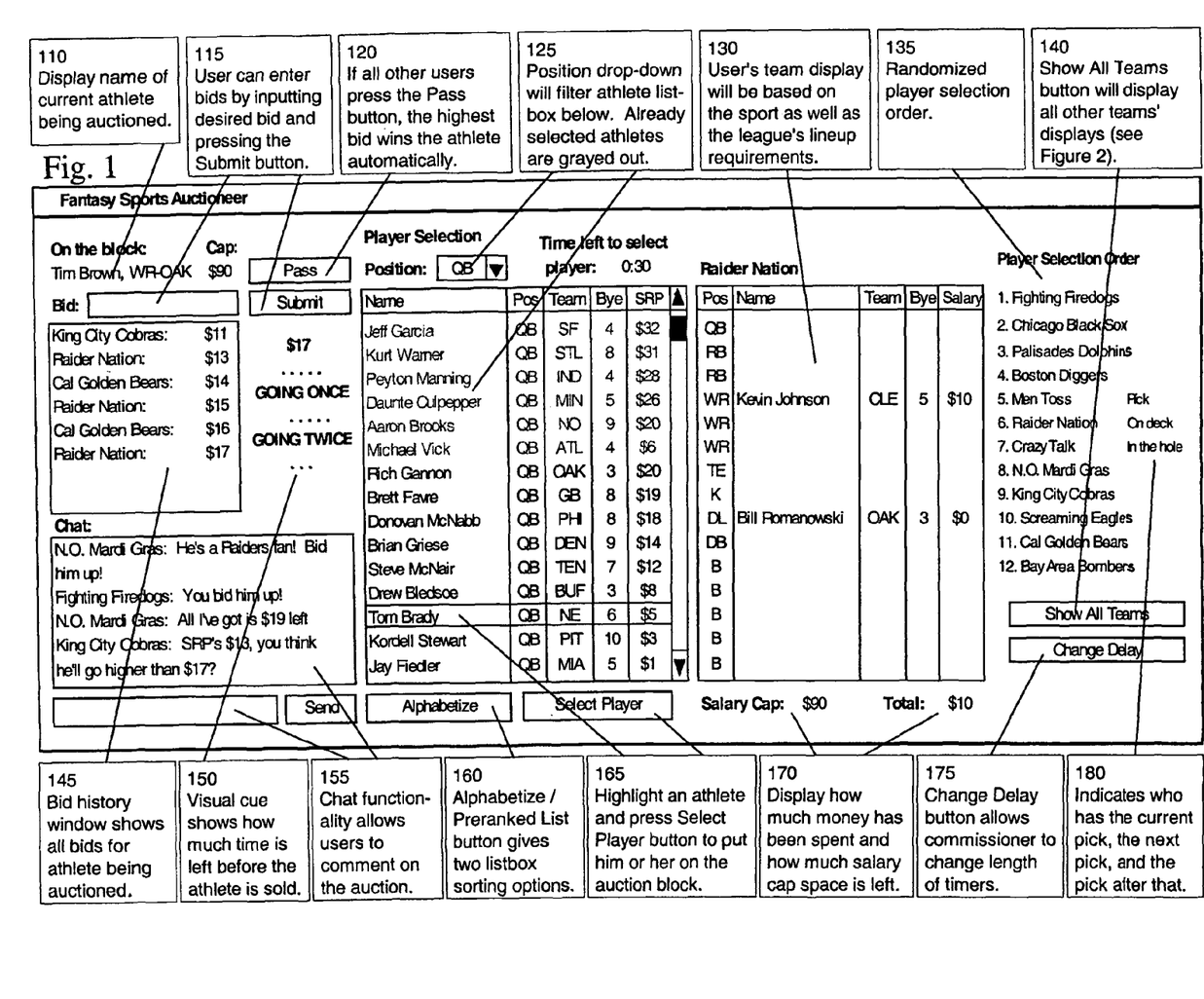
FIG. 1 shows an online auction screen.

FIG. 1 shows a large screen shot showing the preferred embodiment.

In FIG. 1, the Online Auction screen is divided into four parts: the "On the block" portion (110), the "Player Selection" portion (165) where athletes are selected to be put on the auction block, the user's "Team Display" portion (130), and the "Auction Order" portion (135). Currently, the athlete listed under the display name of current athlete being auctioned (110) is "Ahman Green", showing that he is the athlete being auctioned. The manager who is selecting a team of athletes can decide either to submit a bid for the athlete (115) or to pass (120). If every other user presses the Pass button, the highest bidder wins the athlete automatically, regardless of whether the delay time is finished. Below the box for inputting a bid, the bidding history window (145) is displayed, showing the bids of various teams and the current highest bid. The chat box (155) is displayed below the bidding history box (145) showing the comments of the various auction participants to the current bids. The "Say" box (155) allows the auction participants to enter their responses into the chat box.

The "Player Selection" portion (165) shows athletes listed by name and categorized by their position. Users can high-light athletes from the list and click on the "Select Athlete" button in order to put an athlete on the auction block (165). In this example, the NFL athletes are listed by their position, real-life professional NFL team name, and the week of NFL play in which they have a bye and therefore be unavailable. For instance, the highlighted player in the list-box is Brett Favre, who is listed as a quarterback (QB) from Green Bay that will have a bye in the eighth week of NFL play (165). It is important to note that the information displayed in the columns of this list box depend on the fantasy sport for which the auctioneer is being used. For example, for fantasy baseball or basketball, "bye weeks" would not apply, so it would not be shown. Furthermore, the columns may depend on the particular fantasy sports website using the Auctioneer. Websites can select for themselves what data will be shown as pertaining to what they feel is important for their users to decide on which athletes to be placed on the auction block. An example of this might be that a fantasy sports website could add a column with their recommended value of all the available athletes.

The previously selected athletes are shown in lighter lettering (grayed-out) than those awaiting auction (165) and cannot be selected. Underneath the athlete list is a button for either "Alphabetize" or "Pre-ranked List" options (160) of sorting the athletes. If the list is already in alphabetical order, the button would be labeled "Pre-ranked List." If the list is already in order of the pre-ranked list, the button would be labeled "Alphabetize." The pre-ranked list would be predetermined by the host controller (i.e. the Fantasy Sports Auctioneer or the website integrating with it).

The user's "Team Display" portion (130) lists the athletes the user has won in previous rounds of bidding. The user shown is represented by a team named the "Boston Big Heads" (130). The team display lists the athletes on the user's roster along with their position, the actual team of which they are a part, their bye week (again, the data in these columns will depend on the fantasy sport), and their "salary," i.e. the winning bid for each athlete (130). Spaces for unfilled positions are also listed. Below the team display box is the "Salary cap" info (170) that informs the user how much money remains for auctioning and the "total (170)," which is the amount the user has spent so far in auctioning for athletes. (Mathematically speaking, "salary cap"+"total amount"=the preset budget for the fantasy league which in FIG. 1 is $100.)

The "Auction Order" Portion (135) lists the order in which the various teams represented by different users will be allowed to select an athlete to be placed on the auction block (using the aforementioned "Athlete Selection" portion of the screen). To the right of the auction order list are phrases indicating who has the current pick, indicated by the word "Pick," the next pick, indicated by the words "On deck," and the pick after that, indicated by the words "In the hole (180)." Below the Auction order list is an option that allows the user to "show all teams" (140), the result of which is shown in FIG. 2. This command allows the user to see the same information shown in the user's team display for all the teams. This allows the user to see what positions have been filled for each of his or her competitors, as well as how much salary cap money he or she has left. Below the "Show All Teams" button is the "Change Delay" button (175). This button allows one of the league participants (e.g. the league commissioner) to change the different timing mechanisms that are in the Fantasy Sports Auctioneer System. When it is time for an auction participant to select an athlete to be auctioned, for example, he or she is only given a certain amount of time to do so. Additionally, during the bidding process, there is a timing mechanism that measures how much idle time goes by before the athlete being auctioned is won by the highest bidder (this is explained more thoroughly below). The amount of time given for both these functions are predetermined by the host controller. The "Change Delay" button, however, allows one of the league participants to change this time mid-auction.

1. Athlete Player Selection Area

This section of the screen is where an athlete is nominated for auction. This area consists of a "Position" drop-down box, a "Select Player" button, and a list-box populated by athletes' names.

The "Position" drop-down box will be used to sort the list of athletes' names by position. For example, if the Auctioneer is being used for a Fantasy Football League, the "Position" drop-down box might be populated with values such as "Quarterback," "Running Back," "Wide Receiver," "Tight End," "Kicker," etc. By selecting "Running Back" in the drop-down box, the list-box of athletes' names will only be populated by those athletes playing the position of running back in the NFL. This will aid the participant in choosing an athlete to be placed on the auction block. This "Position" drop-down box will obviously be filled by different values for different fantasy sports.

The list-box containing athletes' names will have a highlight to show which athlete is currently selected. The user can move the highlight up and down by using whichever tool the terminal provides (e.g. either a keyboard or mouse for a personal computer, the keypad for a cell phone, etc.). To put an athlete on the auction block, the user highlights an athlete's name and then presses the "Select Player" button. The athletes who have already been auctioned will be grayed out and thus unavailable to be auctioned again.

The "Select Player" button is inaccessible (i.e. grayed-out) to an auction participant until it is his or her turn to select an athlete to be auctioned (as indicated in the "Auction Order" portion of the screen). It is inaccessible to everyone during the actual bidding process, when there is already an athlete on the auction block.

The user will have the option to sort this list-box in alphabetical order or in order of a pre-ranked list (whichever system that integrates with the Fantasy Sports Auctioneer will have the option to set this pre-ranked list). Furthermore, information about the athlete may be added or subtracted to this list-box, depending on what the systems integrating with the Fantasy Sports Auctioneer feel is important to display. For example, the athletes' team, position, or bye week (especially for football) might be added to further aid the participant in selecting an athlete. As mentioned previously, the user selecting an athlete to be auctioned only has a certain amount of time to do so. Some kind of visual cue will be given as to how much time he or she has left or an Artificial Intelligence will select an athlete for the user (see Artificial Intelligence Selection Process below).

2. Bidding and Chat Area

Once a participant selects an athlete to be auctioned, he or she must enter an opening bid. This can be done in the bidding area. After selecting an athlete from the Player Selection Area, the athlete's name appears in the bidding area under the "On the block:" label. Underneath the athlete's name is a "Bid" textbox where the user can enter the opening bid (only zero or positive whole numbers less than the remaining salary cap would be allowed to be entered). Upon pressing the "Submit Bid" button, the participant's team name will appear in the bidding textbox along with the submitted bid. This information is broadcasted to all the league members so that they will all see the athlete to be auctioned and the opening bid. At this point, bidding ensues by participants entering their desired bid into their own "Bid" textbox. In order to enter a successful bid, the bidder must enter a bid that is greater than the current bid and less than or equal to what is allowed by the bidder's remaining budget.

Based on the auction's set bid delay time, a visual cue is given to show how much time is left before an athlete is sold to the highest bidder. In the example in FIG. 1, the delay time (set by a league participant acting as commissioner or by the fantasy website integrated with the Auctioneer) is divided by three, and the result is the amount of time before the messages "Going once!", then "Going twice!", and finally, "Sold!" are displayed. A series of periods (".") will be shown for each second of idle time. If no one is outbidding the highest bid on a current athlete, and 12 seconds of a 15-second set delay time have passed, the following will be displayed: " . . . Going once! . . . Going twice! . . . "—12 periods interspersed with the "Going once!" and "Going twice!" messages. In reality, whatever system (e.g. a fantasy sports website) that chooses to integrate with the Auctioneer can use a different visual display such as a simple count-down timer.

To expedite the bidding process, the auction participants can pass on a given athlete by pressing the "Pass" button. If all auction participants press the "Pass" button, the highest bidder wins the athlete regardless of whether the delay time has finished. Once the bidding goes higher than a particular user's salary cap allows, the system will automatically press the "Pass" button for him or her. The commissioner of the league will also be able to change the delay time mid-auction, in case the league feels that more or less time is needed to run the auction (as mentioned above in the description of the "Change Delay" button). Additionally, there is a chat area where people can type in comments to each other.

C. Team Display Area

The team area is where an auction participant can view which athletes he or she has already won in previous rounds of bidding, as well as the team's remaining salary cap space. The list-box displaying the athletes will be organized to reflect the league's roster requirements, which includes a starting lineup and a number of "bench" spots (i.e. back-ups). In FIG. 1, the starting lineup requirements are: one quarterback (QB), two running backs (RB), three wide receivers (WR), one tight end (TE), one kicker (K), one defensive lineman (DL), one defensive back (DB), and five bench spots (B).

D. League Team Display

FIG. 2 depicts another screen showing a team's display box that is accessed by clicking on the "Show All Teams" button (140) shown in FIG. 1. In the top left corner of the display is the league name which in this case is the "Pi Kapp A league" (210). This team's display screen allows the user to view the athletes selected by the other league participants in order of what is seen in the "Auction Order" portion of FIG. 1. Additionally, the system (e.g. fantasy sports website) using the Auctioneer may choose to attach (e.g. hyper-link) data to each of the given athletes' names to provide research information about the individual athletes (260). This aids auction participants in determining whether to place an athlete on the auction block or whether to bid a certain amount on an athlete. Each column in the team's display box lists the team name above the athlete information section (220) and below has divided sections (240) that provide information regarding the position, name, real-life team, bye week, salary of each selected athlete (270), and/or whatever else information the host controller feels is pertinent to display. Below all this information, additional data is provided regarding the salary cap (the remaining money allowed for auctioning) and the "Total," the amount of money the user has already spent (250), just as shown in the "Team Display" portion in FIG. 1.

The same information described above is shown for the twelve different teams that make up, in this case, the Pi Kapp A League (230).

Additionally, an Artificial Intelligence (AI) program may replace a user when an extra user is required but unavailable. The artificial intelligence program may also temporarily take the place of a user when a user is away from a terminal. If there is more than one required but unavailable user, multiple instances of the system's AI will manifest itself to control the player selection and bidding process for each missing user. For example, if there are three missing human auction participants, three different instances of the Artificial Intelligence program will be run to handle player selection and bidding strategies for each of the missing human participants. Additionally, when a user has run out of time to select a player to be auctioned, the built-in AI's athlete "Selection Algorithm" (see below) will be run to select a player to be auctioned for him or her. Artificial intelligence programs are widely known in the software industry, and a variety of artificial intelligence routines may be purchased commercially.

Many different algorithms can be designed to control the AI of the Fantasy Sports Auctioneer. The AI will generally consist of two algorithms:

1) a "Selection Algorithm" that will determine which athletes to place on the auction block when it is the AI's turn to do so, and
2) a "Bidding Algorithm" that will determine up to how much the AI will bid on a given athlete that is currently being auctioned. The AI will generally use a "price list" preset by the host controller as a basis for both algorithms. This "price list" is a list of all the available athletes to be auctioned with a corresponding unit value that will also be preset by the host controller.

The following "Conditions and Appropriate Actions" describe possible examples of a "Selection Algorithm" and a "Bidding Algorithm."

Conditions and Appropriate Actions for a Possible AI "Selection Algorithm":

The Selection Algorithm would run when it is the AI's turn to select an athlete to be placed on auction. The algorithm breaks down into two decisions: which position (e.g. quarterback, running back, etc.) and which athlete to place on the auction block. Condition 2 below describes the strategy behind which position to elect for auction. Once the AI has decided upon a particular position, it simply chooses the highest ranked player still available on the price list (this is described at the very bottom of the Selection Algorithm description):

Condition 1: The AI's full roster is already completely filled,
  Action 1: The AI will discontinue entirely from the auction process.
  Action 2: Give selection control to whomever is next on the Player Selection list (either human or another AI auction participant).
  Action 3: End Selection Algorithm
Condition 2: The AI's roster is not yet full,
  Condition 2.1: There is more than one starting position yet to be filled,
    Action 1: Randomly select one of these unfilled starting positions.
  Condition 2.2: There is only one starting position yet to be filled,
    Action 1: Select this one position.
  Condition 2.3: All the starting positions are already filled,
    Action 1: Find the position with the least number of back-ups on the bench.
    Condition 2.3.1: There is only one such position,
      Action 1: Select this one position.
    Condition 2.3.2: There is more than one position with the least number of back-ups (e.g. the AI has yet to purchase a back-up for either the starting quarterback or the starting running back),
      Action 1: Find the position with the most number of required starters. Take, for example, a league that requires one starting quarterback, one starting running back, and two starting wide receivers. If the AI has yet to buy any back-ups for any of the starting athletes, it would select a wide receiver because it requires two starters compared to one quarterback and one running back.
      Condition 2.3.2.1: There is only one such position,
        Action 1: Select this one position.
      Condition 2.3.2.2: There is more than one such position (in the previous example, if there were already one back-up wide receiver, but no back-up quarterback or running back),
        Action 1: Randomly select one of these positions.
  For All Subconditions of Condition 2:
  Action 2: For the position selected above, select the most expensive athlete still available on the "price list" for the randomly selected position.
  Action 3: Enter an opening bid of the league's preset minimum bid (e.g. zero dollars).
  Action 4: End Selection Algorithm.

Conditions and Appropriate Actions for a Possible AI "Bidding Algorithm":

Condition 1: The current player placed on the auction block is of a position for which the AI has yet to buy a starter (e.g. a quarterback is placed on the auction block and the AI has yet to buy a quarterbacks),
  Action 1: The AI will multiply the suggested price on the "price list" for this particular athlete with a randomly selected number between 0.5 and 1.5 (e.g. 0.92345 or 1.3762).
Condition 2: The current player placed on the auction block is of a position for which the AI already has bought all the required starters, but not any back-ups.
  Action 1: The AI will multiply the suggested price on the "price list" for this particular athlete with a randomly selected number between 0 and 1.0 (e.g. 0.3342 or 0.9237).
Condition 3: The current player placed on the auction block is of a position for which the AI already has bought all the required starters and one back-up.
  Action 1: The AI will multiply the suggested price on the "price list" for this particular athlete with a randomly selected number between 0 and 0.5 (e.g. 0.0342 or 0.3237).
For Conditions 1 through 3:
Action 2: The AI will round the result of the multiplication done above to the nearest whole number.
Action 3: The AI will then use this whole number as the maximum amount that it will bid for the athlete currently on the auction block.
Action 4: The AI will continue bidding the lowest possible increment (e.g. $1) above any bids of either human or other AI auction participants up to this maximum bid).
  Condition A: A human or another AI auction participant outbids this max bid
    Action 1: Press the "Pass" button.
    Action 2: End Bidding Algorithm.

Condition B: The AI wins the player
   Action 1: Add the athlete to the AI's roster.
   Action 2: Subtract the winning bid from the AI's salary cap.
   Action 3: End Bidding Algorithm.
Condition 4: The current player on the auction block is of a position for which the AI already has bought all the required starters and two back-ups,
   Action 1: Press the "Pass" button.
   Action 2: End Bidding Algorithm.

If the maximum bid calculated above is greater than however much the AI has left on its remaining budget, it can obviously only bid up to what is left on the AI's budget. Also, the number of back-ups up to which the AI will continue bidding (two back-ups in the example above) should be adjusted to the sport and the number of possible bench spots in whatever league is formed. The "adjusting multiplication" done above (i.e. the randomly generated numbers) should also be adjusted based on these factors.

It is important to note once again that the Artificial Intelligence described above can be used for any fantasy sport (even though football was used as an example). Furthermore, the Artificial Intelligence described above can be made to be more sophisticated based on certain sport and league settings. The aforementioned description is only to give an idea of how a possible AI routine may be designed.

Artificial Intelligence programs may replace a user temporarily for bidding with the user and assigning values for nominating athletes and values for the maximum bid that a user is willing to spend on bidding for fantasy athletes. Artificial Intelligence programs may also bid randomly for fantasy athletes or bid based upon a set value of a fantasy athlete calculated from historical statistical data.

Additionally, a critical part of the system is a way for the league (most notably through the "commissioner") has control over different aspects of the auction. The commissioner is an administrative user configured on the system to have at least the following additional powers:

1. The commissioner is able to determine the nomination order of the auction prior to the auction's start time. While the system can randomize the nomination order, the commissioner should be able to input a predetermined nomination order in advance of the auction.
2. The commissioner can also choose a nomination order that either inverts every other round (i.e. 1-12 for the first round, then 12-1 for the second, 1-12 for the third, etc.—also known as the "serpentine format", similar to a snake draft) or does not invert (i.e. 1-12, 1-12, 1-12 for all rounds—also known as a "straight draft"). The commissioner should be able to make this determination before the auction, as well as change it mid-auction.
3. During the auction, the commissioner has an "Edit Rosters" feature that allows him or her to make changes to players' rosters—move players from one team to another and/or change the player's prices. Specifically for baseball, where many players qualify for more than one position (e.g. first base and outfield), the commissioner should be able to use this "Edit Rosters" feature to change the player's position from one to another. The commissioner should also be able to add or drop players as necessary.
4. Since the system can have an Artificial Intelligence (A.I.), options should be provided so that the users can control when the Artificial Intelligence should take over a given team. The Artificial Intelligence, for example, can take over as soon as a user is not in the auction room (e.g. if they get involuntarily disconnected, are late to the auction, or simply closes the window and exits voluntarily). The user, however, might not want this to happen because the A.I. could potentially purchase players the user does not want while he is out (in the case of him being temporarily disconnected). The user should then be given the option to turn off this auto-A.I. feature. If, however, a user loses his connection permanently and cannot get back into the auction room, the commissioner should be given the option to turn the A.I. back on for that particular team.

Figure 3:
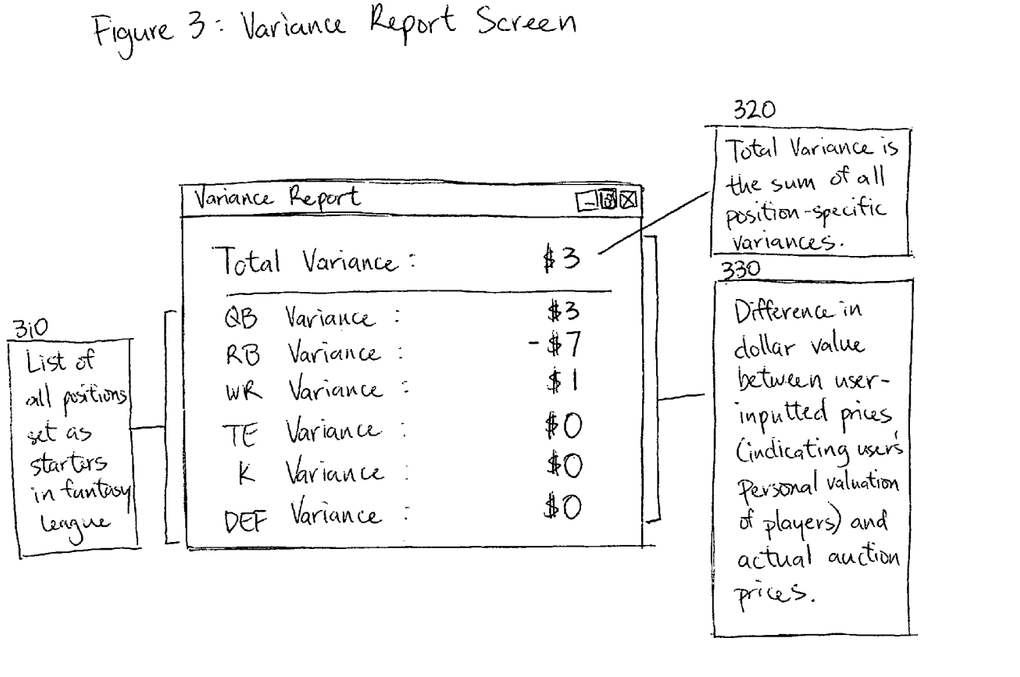
FIG. 3 shows a sample variance report.
Figure 4:
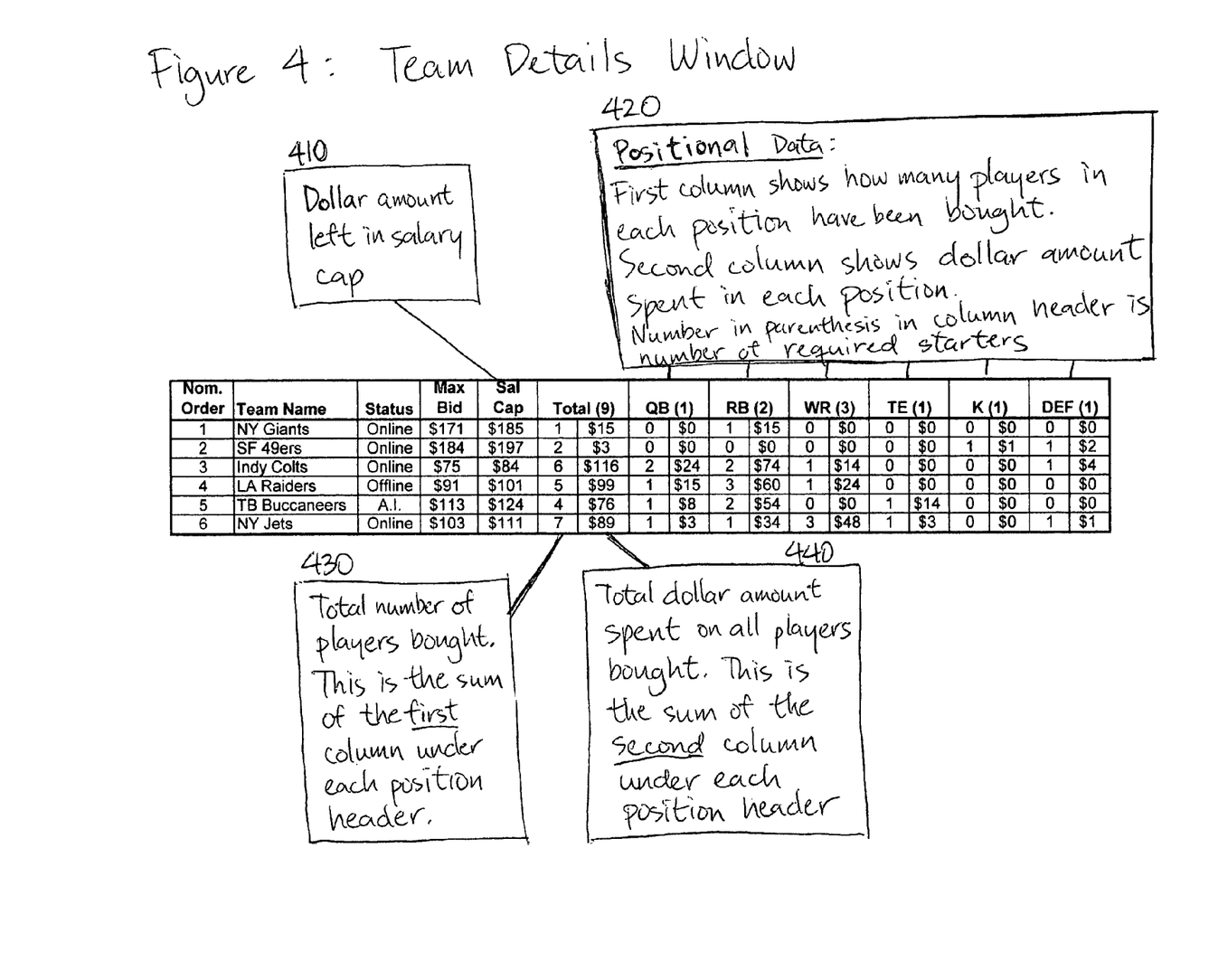
FIG. 4 shows a sample team detail.

In addition to controlling certain aspects of the way the auction is run, the Fantasy Sports Auctioneer System can also provide tools to help the auction participant analyze the auction:

1. The system has a "Team Details" window that displays a sortable table of important auction data:
   a. The nomination order
   b. Team names
   c. Each team's online status (Online, Offline, or A.I. controlled)
   d. Each team's maximum bid
   e. How many of each required starting position has already been filled in all the teams (e.g. Total: 3/9, QB: 0/1, RB: 1/2, WR: 2/3, TE: 0/1, K: 0/1, DEF: 0/1- meaning out of a total of 9 starters, 3 have been filled, 0 out of the 1 required starting quarterback, 1 of the 2 required starting running backs, 2 of the 3 required starting wide receivers, and 0 of the 1 required starting tight end, kicker, and defensive team).
   f. How much money has been spent on each position
   g. How much money has been spent in total
   h. How much money remains in the salary cap
   FIG. 4 shows a sample Team Details window. The team details window includes the dollar amount left in the salary cap 410, the positional data 420 that shows the number of players in each positions that have been purchased and a second column that shows the dollar amount spent in each position and also the number in parentheses in each column header for the required number of starters. The team details window also shows the total number of players bought 430, which is the sum of the first column under each position header. Also, the team details window shows the total dollar amount spent on all players bought 440 this is the sum of the second column under each position header.
2. The user should have the ability to input a value list of his own prior to the auction so that the user's prices will be easily visible next to each player's name on the Fantasy Auctioneer System. This will make tracking bids and the user's perceived values much easier.
3. The system will also keep track of a "variance report". FIG. 3 shows a sample variance report. The reports screen shows a list of all positions sat as starters in the fantasy league 310. The report screen also shows the total variance that is the sum of all the position specific variances 320. Their report screen also shows the difference in dollar value between user imputed prices 330.

It will show the user how much more or less the real prices are compared to the value list inputted in #2 above—in total and organized by position. Let's say, for example, that the first three players sold in the auction are running back Shaun Alexander for $75, quarterback Peyton Manning for $40, and wide receiver Terrell Owens for $36. If the user inputted prices for these three players (through feature #2 directly above) as $80, $38, and $30 respectively, then the variance report will show the following:

a. Total Variance: $3—because Shaun Alexander sold for $5 less than expected, Peyton Manning sold for $2 more than expected, and Terrell Owens sold for $6 more than expected (−$5+$2+$6=$3).
b. QB Variance: $2—because quarterback Peyton Manning sold for $2 more than expected.
c. RB Variance: −$5—because running back Shaun Alexander sold for $5 less than expected (so it is a negative number)
d. WR Variance: $6—because wide receiver Terrell Owens sold for $6 more than expected
e. TE Variance: $0—because no tight ends have been sold yet
f. K Variance: $0—because no kickers have been sold yet
g. DEF Variance: $0—because no defensive teams have been sold yet These data points are important because it helps the auction participant gauge how "the market" is pricing players relative to his or her personal valuation of all the players (i.e. the value list he inputted into the system before the auction).

Some auction participants might be in the same physical room with or without other auction participants participating remotely. Any teams participating remotely will use the same system described above, while those participating in the same physical room will have some special features in their Fantasy Sports Auctioneer window:

1. As auction participants in the same room shout out their bids, someone will input everyone's bids into the system.
2. If a fantasy athlete is sold to a high bid coming from someone in the same physical location, the person inputting the bids will then have to assign that player to the team of the winning bid. Note that this is done automatically if everyone is using their own terminal, but with people sharing the same terminal, the extra step of manually assigning the fantasy athlete to the winning team is necessary.
3. If the winning bidder erroneously bid more than he can afford (i.e. more than his salary cap allows), the system will give the option of re-doing the bidding for that particular athlete.

The foregoing describes the preferred embodiments of the invention and modifications may be made without departing from the spirit and scope of the invention as set forth in the following claims.

Call Out List
110 Display name of current athlete being auctioned
115 Location for entering bids allowing input of desired bid by pressing the "Submit" button.
120 Pass Button.
125 Position dropdown box will filter the Athlete Selection list-box by selected position.
130 User's Team display sport contextual fantasy website and league's line-up requirements.
135 Randomized athlete selection order
140 "Show All Teams" button brings up all of the team displays
145 Bidding history window shows who has bid what and who currently has the highest bid
150 Visual cue to show how much delay time is left over before the athlete is sold
155 Chat functionality allows auction participants to comment on the auction
160 Alphabetize/Pre-ranked List buttons give two athlete list-box sorting options
165 Highlight an athlete and press "Select Athlete" button to auction him or her off.
170 Displays how much money has been spent and how much salary cap space is left
175 "Change Delay" button allows league commissioner to change auction delay time
180 Indicates who has the current pick, the next pick, and the pick after that.
210 League name will be displayed here
220 Names of each team will be displayed.
230 All team displays are based on the league's starting lineup and bench requirements
240 Based on the sport as well as user input, different data can be shown here.
250 Display money user spent and salary cap remaining.
260 All displays of athlete names, including list-box, under "On the Block" label, or in the "Team Display" areas of both FIGS. 1 and 2 may be hyper-linked to provide research information.
270 The amount of money spent on each athlete is shown in the salary column

The invention claimed is:

1. A system for managing a fantasy sports game for a plurality of participants representing sports teams each wishing to form a fantasy sports team made up of actual athletes, and each operating a participant terminal operable to act as a client on a computer network, the system comprising: a host controller, the host controller comprising a computer operable to act as a server on the computer network and to communicate with the participant terminals over the computer network; and data storage accessible to the host controller, the data storage storing information relating to performance of the athletes in actual games, the host controller configured to:

(a) to create a hierarchical order of teams to determine priority in athlete nomination for auction, either by randomly generating the order or by allowing a user to input a predetermined nomination order;
(b) to provide a choice of either: inverting the athlete nomination order every other round whereby the team who had the last pick in the first round will have the first pick in the second round; or keeping the nomination order the same each round;
(c) to solicit and accept a request from the nominating team for nomination of an athlete for auction;
(d) to display the nominated athlete for auction on all participant terminals;
(e) to display on all participant terminals a visual indicator to show the beginning of a predetermined auction time, the passage of a predetermined auction time, and the end of a predetermined auction time, an initial value in predetermined auction time being previously set by the host controller;
(f) to display on all participant terminals a visual indicator to show the beginning of a predetermined athlete selection time, the passage of a predetermined athlete selection time, and the end of a predetermined athlete selection time, an initial value in predetermined athlete selection time being previously set by the host controller;
(g) to solicit, accept and display successively higher participant bids during the predetermined auction time;
(h) to determine and display the winning team of the athlete auction and assign the winning team the purchase of the athlete from no more than a predetermined number of game value units initially allocated by the host controller, an initial value in game value units for each athlete being previously set by the host controller;

(i) to provide a means for a user in the auction or the commissioner to change the fantasy team and/or price of a given fantasy athlete;

(j) to provide a means for a user in the auction or the commissioner to change the position where a given fantasy athlete is set whereby a user may change a player's designation from first base to outfield in a baseball fantasy sports game;

(k) to provide a option for the user to control when an Artificial Intelligence instance will take over a given team, wherein a user will have an option on whether an Artificial Intelligence will take over his team, wherein the commissioner user will have the option to override that given user's selection on Artificial Intelligence control, (l) a tabulation means for assigning a team score proportional to data storage relating to actual performance of the athletes on the participant's team; and (m) responsive to a request of a participant, to access the data storage and report a status of the participant's fantasy team, the status including information as to actual performance of the athletes on the participant's team;

(n) wherein the host controller is operable: to be responsive to a request of a participant team, to display a variance report which calculates the total difference in price between all the sold players' prices and the values inputted by the participant team before the auction, wherein the variance report can also show the difference in price between all the sold players' prices and the values inputted by the participant team before the auction organized by position;

(o) wherein the host controller is configured: to display on participant terminals a team registry of athletes showing athlete composition of all participants' fantasy sports teams, wherein the host controller is configured: to display on participant terminals, the hierarchical team order for nomination of athletes, wherein the initial value in predetermined auction delay time is varied by the host controller and can be lengthened or shortened for later rounds of bidding, wherein the initial value in predetermined athlete selection delay time is varied by the host controller and can be lengthened or shortened for later rounds of bidding, wherein the host controller varies the initial value in predetermined auction time from auction to auction; and (p) further including a means for displaying private messages sent by users to each other, and further including a means for displaying public messages sent to the entire group, further including a chat function; and (q) wherein the host controller is configured: to accept a pass selection by participant team that can elect to pass an athlete and discontinue bidding on the athlete, wherein the auction for the athlete terminates upon the pass selection by all participants teams except for the highest bidding participant team who is awarded the purchase of the athlete at the highest bid, further including a means to identify participant teams by unique league names; wherein the host controller is operable: responsive to a request of a participant team, to display an alphabetized or pre-ranked list of athletes, wherein the host controller is operable: responsive to a request of a participant team, to display a bidding history for athletes; wherein the host controller is operable: responsive to a request of a participant team, to display critical auction data comprising:
  i. How many of each required starting position has already been filled in all the teams participating,
  ii. How much money has been spent by each team on each position
  iii. How much money has been spent by each team in total
  iv. How much money is left in each team's salary cap (o) wherein the host controller is configured: to be responsive to a request of a participant team, before the auction, accept an auction value list consisting of fantasy athletes, each with an assessed dollar value based on the participant team's opinion, wherein dollar values will then be displayed by the host controller on that participant team's terminal during the auction; wherein the host controller is operable: responsive to a request of a participant team, to display a variance report which calculates the total difference in price between all the sold players' prices and the values inputted by the participant team before the auction, wherein the variance report can also show the difference in price between all the sold players' prices and the values inputted by the participant team before the auction organized by position; wherein the host controller is operable to allow a user to manually assign which team a fantasy athlete should go to after a sale when there is more than one person sharing the same terminal.

* * * * *